US008806465B2

(12) United States Patent
Lebert (10) Patent No.: US 8,806,465 B2
(45) Date of Patent: Aug. 12, 2014

(54) REFACTOR EXCEPTION CLASS HIERARCHY FOR REDUCED FOOTPRINT AND FASTER APPLICATION START

(75) Inventor: Berthold Martin Lebert, Phoenix, AZ (US)

(73) Assignee: International Busines Machines Corporation, Armonk, NY (US)

( * ) Notice: Subject to any disclaimer, the term of this patent is extended or adjusted under 35 U.S.C. 154(b) by 921 days.

(21) Appl. No.: 12/959,796

(22) Filed: Dec. 3, 2010

(65) Prior Publication Data

US 2012/0144366 A1    Jun. 7, 2012

(51) Int. Cl.
*G06F 9/44* (2006.01)
*G06F 9/45* (2006.01)

(52) U.S. Cl.
USPC ........... 717/159; 717/151; 717/152; 717/153; 717/166; 717/140

(58) Field of Classification Search
None
See application file for complete search history.

(56) References Cited

U.S. PATENT DOCUMENTS

| | | | |
|---|---|---|---|
| 6,131,187 A | 10/2000 | Chow | |
| 6,412,109 B1 | 6/2002 | Ghosh | |
| 7,080,366 B2 | 7/2006 | Kramskoy | |
| 2004/0230962 A1* | 11/2004 | Ogasawara | 717/151 |
| 2008/0052684 A1* | 2/2008 | Bowdidge et al. | 717/136 |
| 2009/0144697 A1* | 6/2009 | Foley et al. | 717/110 |
| 2010/0218175 A1 | 8/2010 | Foley | |

OTHER PUBLICATIONS

Julio Taveria et al, "Assessing Intra-application Exception Handling Reuse with Aspects", 2009, XXIII Brazilian Symposium on Software Engineering.*
Falconer et al., A Declarative Framework for Analysis and Optimization, Department of Computing, Imperial College London, Google, 2008-2009.
Dietrich et al., On the Detection of High-Impact Refactoring Opportunities in Programs, Google, Jun. 9, 2010, arXiv:10061747v1 [cs.SE].
Ballard et al., Rewriting Strategies in Java, UHP & LORIA, INRIA & LORIA, and INPL & LORIA, Campus Scientific, Vandoeuvre-les-Nancy Cedex France, Google, Apr. 21, 2008, inria-00274919, version 1.
Klint et al., RASCAL: A Domain Specific Language for Source Code Analysis and Manipulation, Centrum Wiskunde & Informatica and Informatics Institute, University of Amsterdam, Google, 2007-2008.

* cited by examiner

*Primary Examiner* — Lewis A Bullock, Jr.
*Assistant Examiner* — Mark Gooray
(74) *Attorney, Agent, or Firm* — Shimokaji & Associates, P.C.

(57) ABSTRACT

A method, system, and program product for removing exception classes that match a pattern is disclosed. Exception classes are searched for those of the exception classes that match that pattern. The parent classes of matched exception classes are refactored to accept an exception type argument. Code that throws the matched exceptions is rewritten by replacing the exception class with the parent class and adding a corresponding exception type. Code that catches the thrown exceptions is rewritten by changing a catch clause to catch a parent exception class and inserting a case statement for the exception type in that catch clause. The matched exception classes are removed.

22 Claims, 8 Drawing Sheets

```
public class AnException extends Throwable {                                500
    public AnException() {
            super();
    }
    public AnException(String message) {
            super(message);
    }
    public String toString() {
            String msg = getLocalizedMessage();
            String name = getClass().getName();
            if (msg == null) return name; else return name+": "+msg;
    }
} public class Chld1Exception extends AnException {
    public Chld1Exception() {
            super();
    }
    public Chld1Exception(String message) {
            super(message);
    }
} public class GrandChld1Exception extends Chld1Exception {
    public GrandChld1Exception() {
            super();
    }
    public GrandChld1Exception(String message) {
            super(message);
    }
} public class Chld2Exception extends AnException {
    public Chld2Exception() {
            super();
    }
    public Chld2Exception(String message) {
            super(message);
    }
} public class GrandChld2Exception extends Chld2Exception {
  public GrandChld1Exception() {
            super();
  }
  public GrandChld2Exception(String message) {
            super(message);
  }
}
```

```
public class AnException extends Throwable {
    public short type;
    public static final short X_C1 = 0;
    public static final short X_C2 = 1;
    public static final short X_GC1 = 2;
    public static final short X_GC2 = 3;
    priv_static final String[] NAMES = new String[] {
            "Chld1Exception",
            "Chld2Exception",
            "GrandChld1Exception",
            "GrandChld2Exception"
    };
    public TestException() {
            super();
            this.type = -1;
    }
    public TestException(short type) {
            super();
            this.type = type;
    }
    public TestException(String message) {
            super(message);
            this.type = -1;
    }
    public TestException(String message, short type) {
            super(message);
            this.type = type;
    }
    public String toString() {
            String msg = getLocalizedMessage();
            String name = type == -1 ? getClass().getName() : NAMES[type];
            if (msg == null) return name; else return name+": "+msg;
    }
}
```

```
public class Exception Thrower {
    public int arg;
    public ExceptionThrower() {
    }
    public void run() throws Chld2Exception {
710 →        if (arg == 0) {
                throw new Chld2Exception("");
            }
            throw new GrandChld2Exception("");
    }
}
```

```
public class ExceptionThrower {
    public int arg;
    public ExceptionThrower() {
720 → }
    public void run() throws AnException {
        if (arg == 0) {
            throw new AnException("", AnException.X_C2);
        }
        throw new AnException("", AnException.X_GC2);
    }
}
```

```
public class ExceptionCatcher {
        public ExceptionCatcher() {
810 →   }
        public void run() {
                ExceptionThrower t = new ExceptionThrower();
                try {
                        t.run();
                } catch (GrandChld2Exception e) {
                        // perform some code
                } catch (Chld2Exception e) {
                        // perform some other code
                }
        }
} public class ExceptionCatcher {
        public ExceptionCatcher() {
        }
        public void run() {
                ExceptionThrower t = new ExceptionThrower();
                try {
820 →           t.run();
                }catch (AnException e) {
                        switch (e.type) {
                        // GrandChld2Exception
                        case AnException.X_GC2:
                                // perform some code
                                break;
                        // Chld2Exception
                        case AnException.X_C2:
                                // perform some other code
                        default:
                                // cannot happen
                        }
                }
        }
}
```

FIG. 8

REFACTOR EXCEPTION CLASS HIERARCHY FOR REDUCED FOOTPRINT AND FASTER APPLICATION START

BACKGROUND

The present invention relates generally to the field of optimizing memory usage, and more specifically, to optimizing memory usage and startup performance by refactoring object oriented program code and reducing the number of classes in an application with an optimizer tool.

An object oriented application may consist of classes, each of which may contain methods (or functional members, or functions) that may contain the instructions to run the program. Classes may also contain data members (fields). Classes may be "instantiated" in order to create objects. Each object may contain its own set of data as specified by the data members of the class, and the functional members of any given object may be capable of acting on the data members of the object.

Some languages may allow for the "throwing" of objects in which the execution stack of invoked methods may be unwound due to an exceptional condition, until code that is capable of handling the exceptional condition is located. These objects are instances of exception classes. Generally the exception classes are organized in class hierarchy with each subclass expressing an exception type. In most cases these subclasses do not provide additional methods or fields, which means their type is the only information these classes provide.

On some platforms, particularly embedded and mobile device platforms, memory usage must be kept to a minimum. Small differences in memory requirements may result in sizable savings relative to the cost of the device. Removing unneeded exception classes can reduce memory usage.

Hence, there is a need for a more efficient system and method for removing exception classes.

SUMMARY

According to embodiments of the present invention, a method, computer product, or system comprise searching exception classes stored in computer memory for those of the exception classes that match a pattern; refactoring the parent classes of the matched exception classes to accept an exception type argument; rewriting a section of code that throws the matched exceptions by replacing the exception class with the parent class and adding a corresponding exception type; changing a list of thrown exceptions in a method declaration; rewriting a section of code that catches the thrown exceptions by changing a catch clause to catch a parent exception class and inserting a case statement for the exception type in that catch clause; and removing the matched exception classes.

The above and below advantages and features are of representative embodiments only, and are not exhaustive and/or exclusive. They are presented only to assist in understanding the invention. It should be understood that they are not representative of all the inventions defined by the claims, and are not to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims. These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention describes a method for removing exception classes from code for optimizing memory usage.

Figure 5:
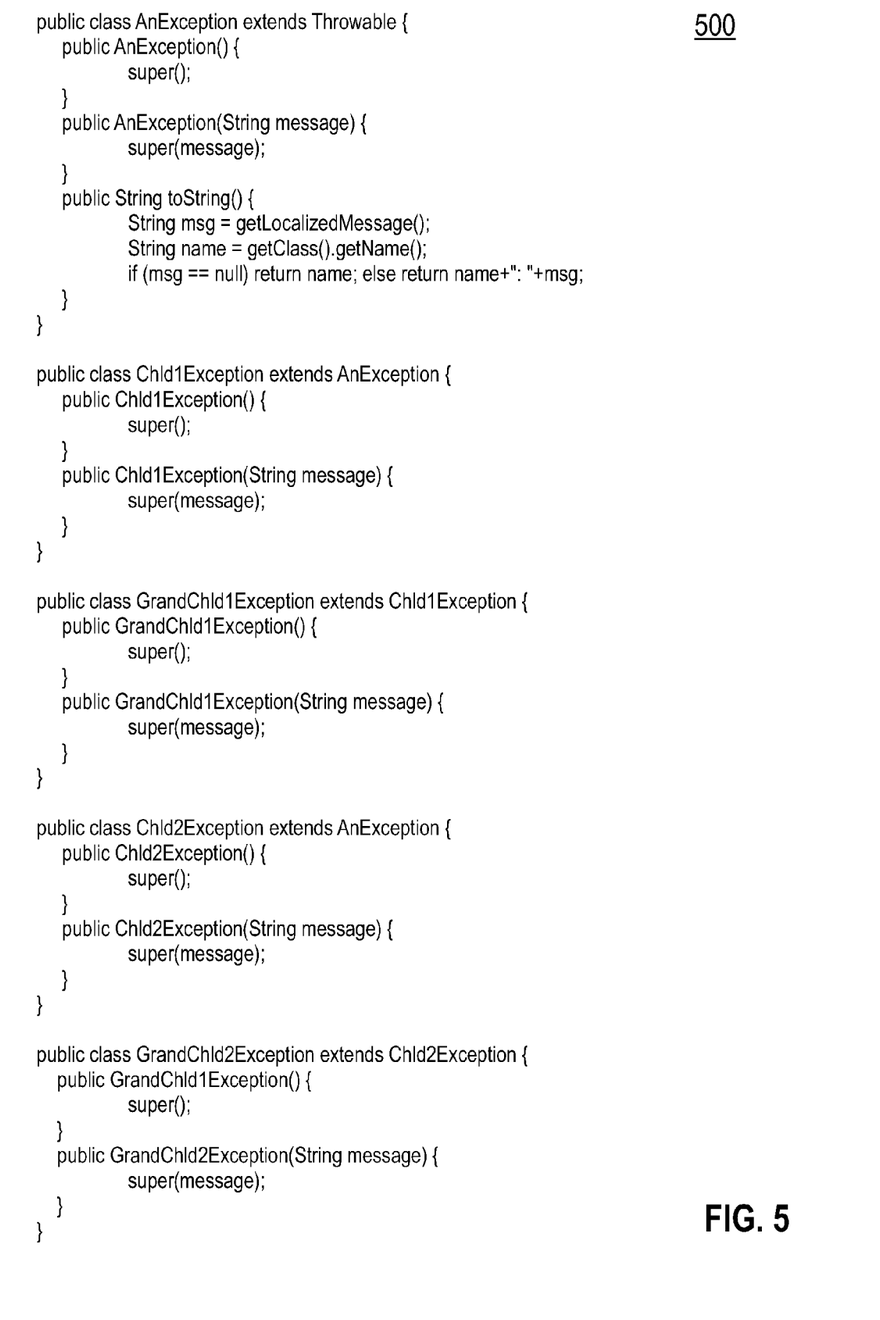
FIG. 5 shows an example exception class hierarchy with one parent class with 2 subclasses which themselves have subclasses.

The present invention may remove exception classes from code by finding and removing exception classes that match a pattern (subclasses that do not add more information other than their exception type as expressed by their class type). FIG. 5 shows some examples of these kinds of classes. Besides the exception type (the class itself) they do not provide any additional information and/or behavior. In praxis the vast majority of exception classes are implemented like this. The following description shows a unique method that may be automated to remove exception classes. Removal of unnecessary exception classes may optimize memory usage.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable media may be utilized. Computer readable media may include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

Figure 1:
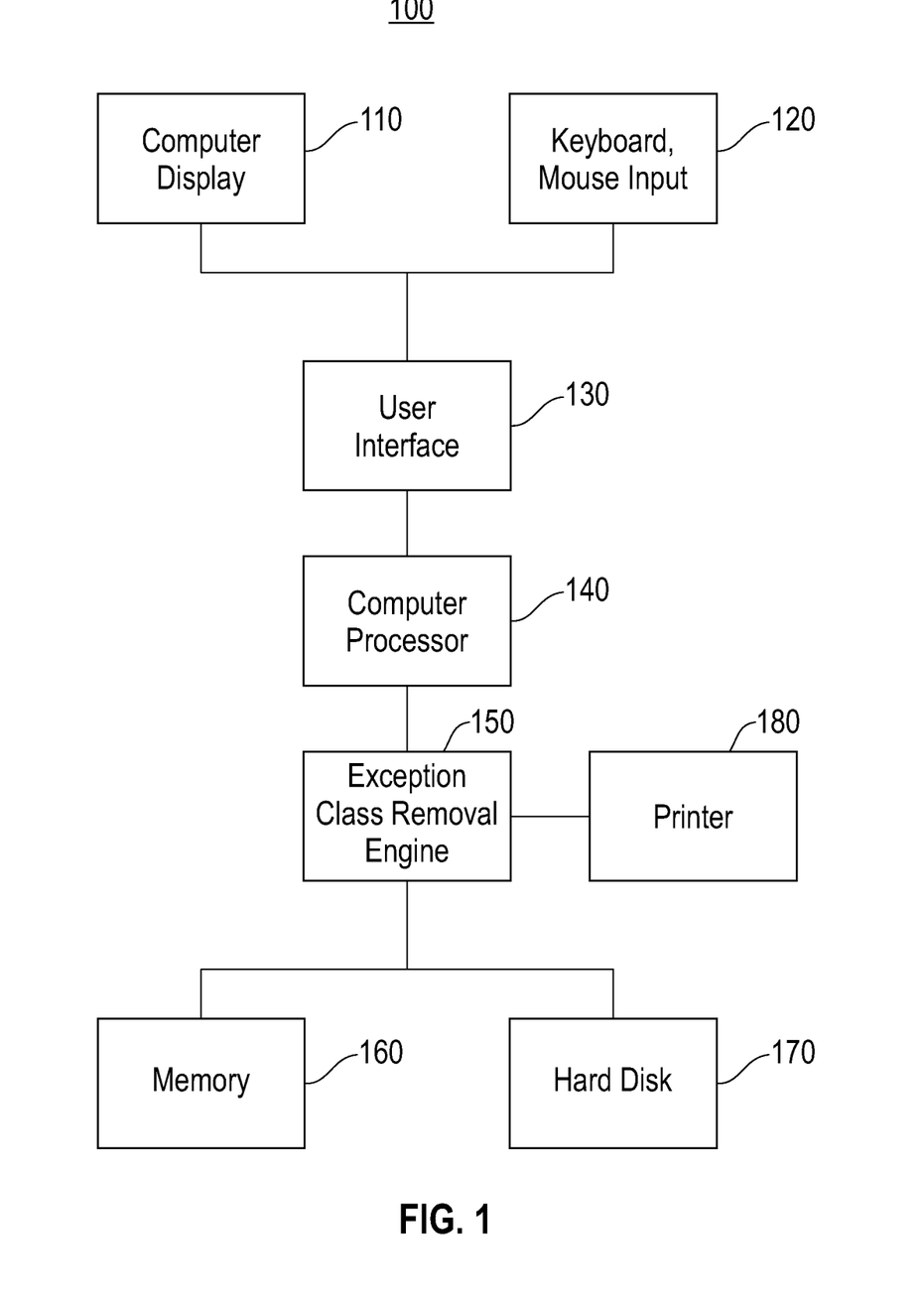
FIG. 1 is a block diagram of a system according to one exemplary embodiment of the invention.

FIG. 1 is a block diagram of a system 100 according to an exemplary embodiment of the invention. The system 100 may include a computer display 110, a keyboard and mouse 120, a user interface 130, a computer processor 140, an exception class removal engine 150, memory 160, a hard disk 170, and a printer 180.

A user may utilize the invention by operating the user interface 130 with the keyboard and mouse 120 and displaying results on the computer display 110. The user may utilize the system 100 by inputting data and functions from the user interface 130 for processing by the exception class removal engine 150. The exception class removal engine may be processed by a computer with a computer processor 140. The user interface 130 and the exception class removal engine 150 may be stored in computer random access memory 160 and on a hard disk 170. The user may also print operations from the user interface 130 on the printer 180.

Figure 2:
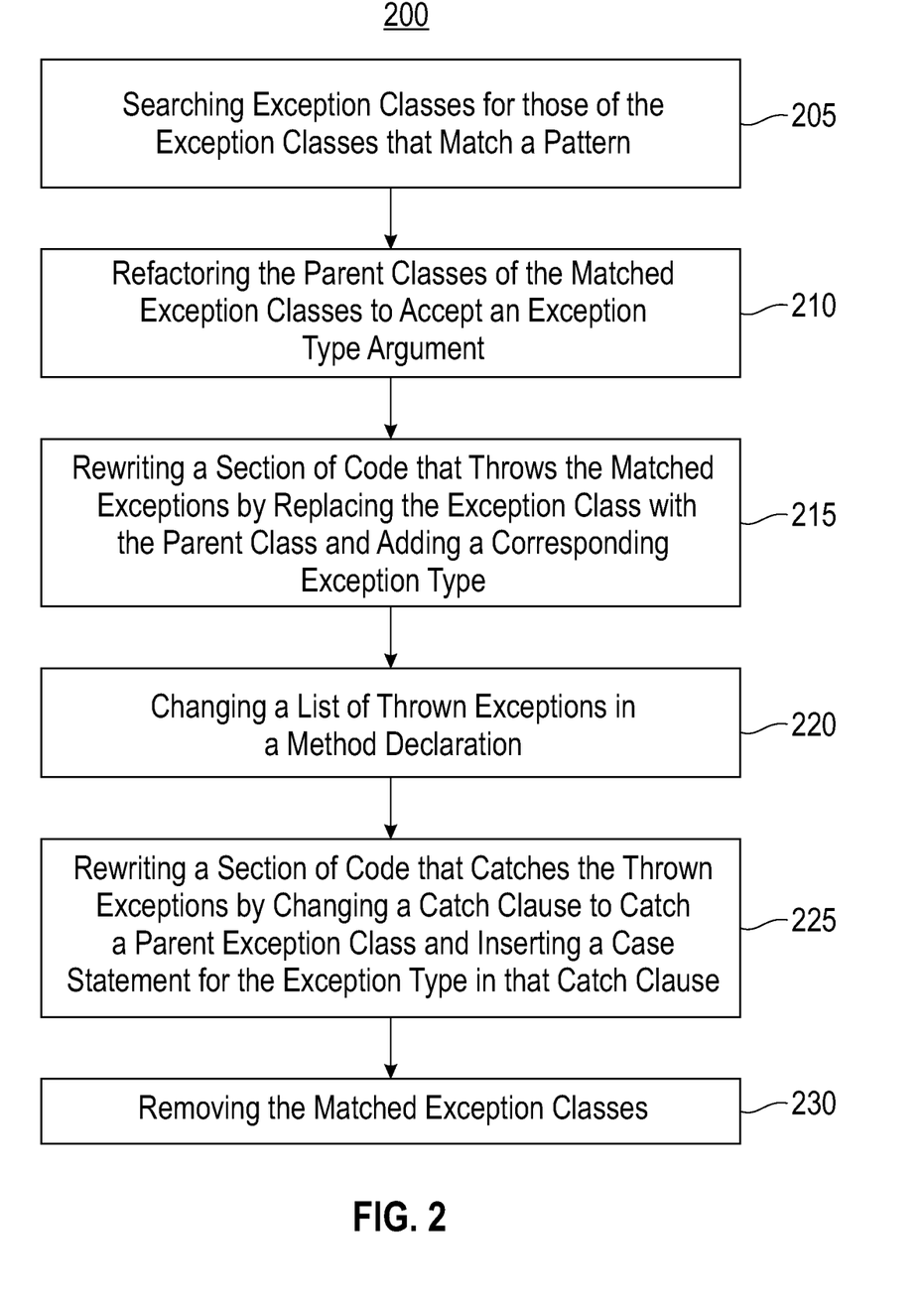
FIG. 2 is a flowchart of an exemplary embodiment of the invention.

An exemplary embodiment may include removal of exception classes as shown in FIG. 2.

As shown in FIG. 2, removal of exception classes 200 may include a step 205 of searching exception classes for those of the exception classes that match a pattern (subclasses that do not add more information other than their exception type as expressed by their class type). A step 210 may include refactoring the parent classes of the matched exception classes to accept an exception type argument. A step 215 may include rewriting a section of code that throws exceptions by replacing the exception class with the parent class and adding a corresponding exception type. A step 220 may include changing a list of thrown exceptions in a method declaration. A step 225 may include rewriting a section of code that catches the thrown exceptions by changing a catch clause to catch a parent exception class and inserting a case statement for the exception type in that catch clause. A step 230 may include removing the matched exception classes.

In other possible embodiments, the list of thrown exceptions may be removed at runtime. Exception code numbers may be created to represent the exception classes. Unused methods may be removed from the parent exception classes. A table may be created including each found exception class. A numeric type may be assigned to each of the found exception classes. Constants may be created for each of a plurality of numeric exception types. As an example, the numeric type may be incremented by one for each found exception class. An optimizer may be used to remove exception classes. Unused type names and exception types may be removed from the parent exception classes. IF statements may be replaced with switch statements if several exceptions are caught in the same block of code.

Figure 3:
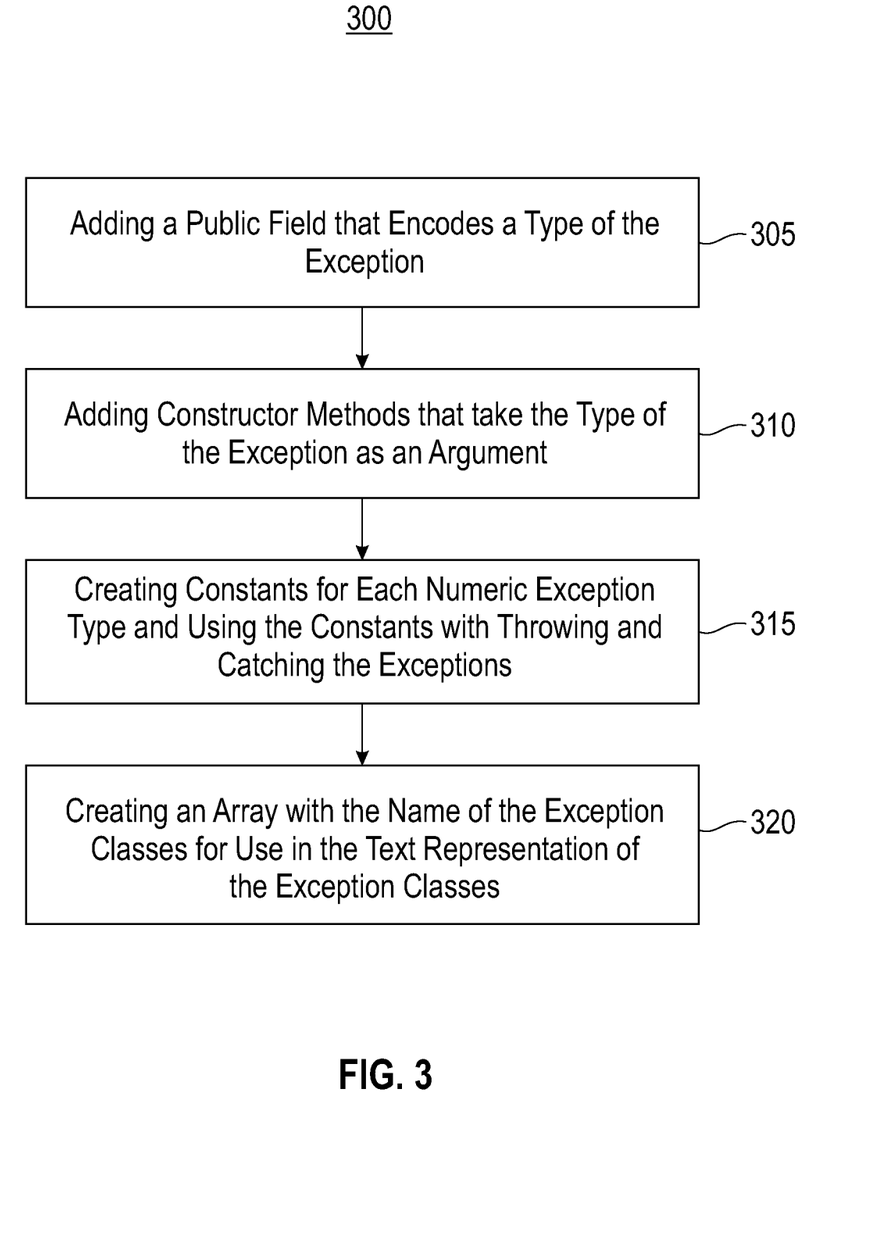
FIG. 3 is a flowchart of refactoring the parent exception classes in an exemplary embodiment of the invention.

Exemplary processing in the system 100 of FIG. 1 may be described with reference to FIG. 3. FIG. 3 is an exemplary embodiment of the invention of block 210 in FIG. 2 showing refactoring matched exception classes to accept an exception type argument.

As shown in FIG. 3, refactoring matched exception classes 300 may include a step 305 of adding a public field that encodes a type of the exception. A step 310 may include adding constructor methods that take the type of the exception as an argument. A step 315 may include creating constants for each numeric exception type and using the constants with throwing and catching the exceptions. A step 320 may include creating an array with the name of the exception classes for use in the text representation of the exception classes.

In other possible embodiments, names of the exception types may be shortened by using initials. An exception code number may be printed as output instead of a text representation of the exception type names. A call to a constructor may be further added to the type of an exception. An exception catch clause may be modified such that the parent exception class is caught.

Figure 4:
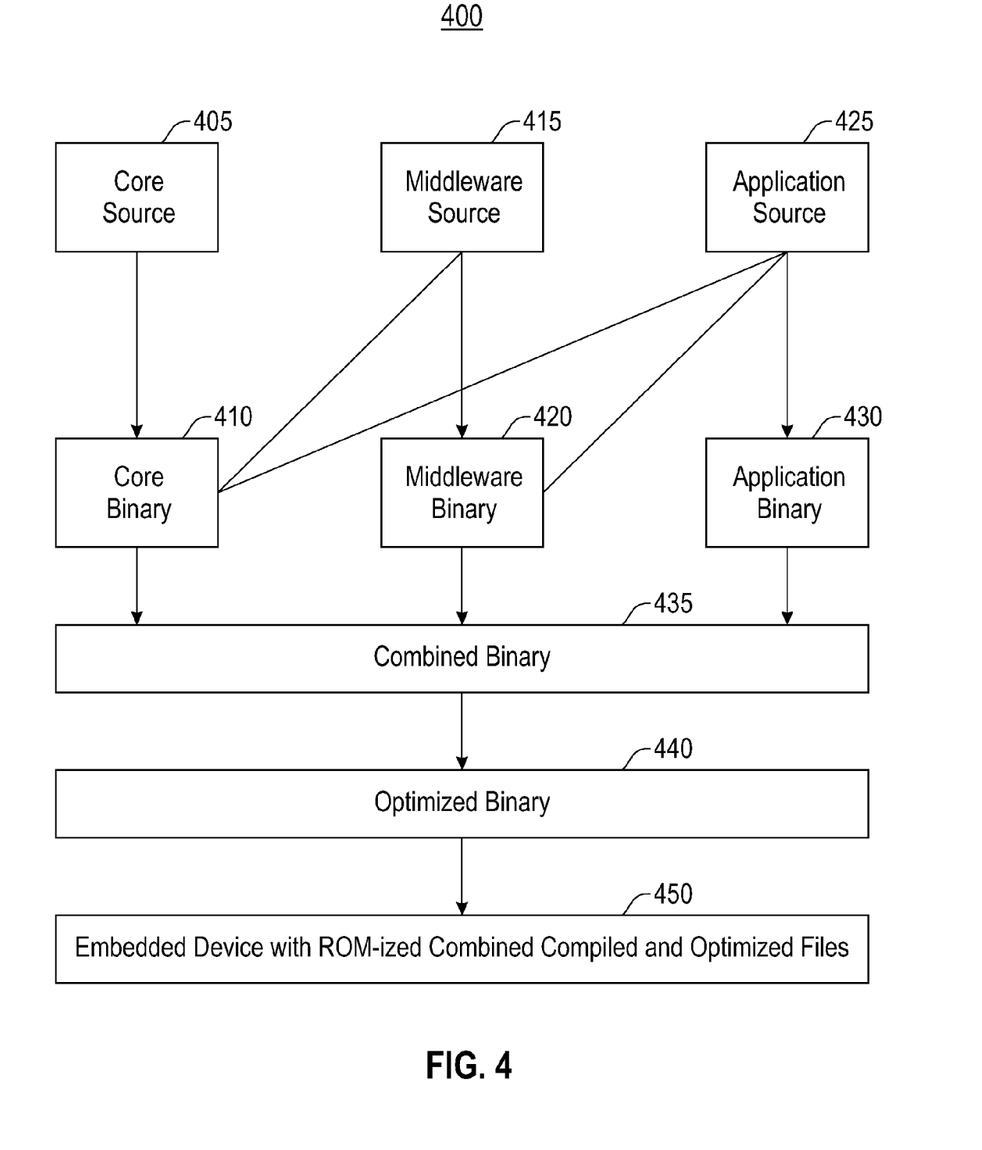
FIG. 4 is block diagram illustrating transition of code types for implementing the method of FIG. 2.

Exemplary processing in the system 100 of FIG. 1 may be described with reference to FIG. 4. FIG. 4 illustrates transition of code types 400 for implementing the method of FIG. 2.

As shown in FIG. 4, core source files 405 may be compiled into core binary class files 410. Middleware source files 415 may be compiled against the binary class files 410 into middleware binary files 420. Application source files 425 may be compiled against the binary class files 410 and the middleware binary files 420 into application binary files 430. Binary class files 410, middleware binary files 420, and application binary files 430 are combined to form combined binary class files 435. The combined binary class files 435 may then be optimized as shown at block 440. An embedded device is shown at block 450, with ROM-ized (converted to a format that can be stored in Flash memory) combined binary class files embedded with the device 450.

In another embodiment, binary files resulting from the compiled files may be packaged into separate component files.

FIG. 5 shows an example exception class hierarchy in source format with one parent class with two subclasses which themselves have subclasses. The subclasses may be candidates for removal that do not add additional behavior and can be removed after references to them are removed.

Figure 6:
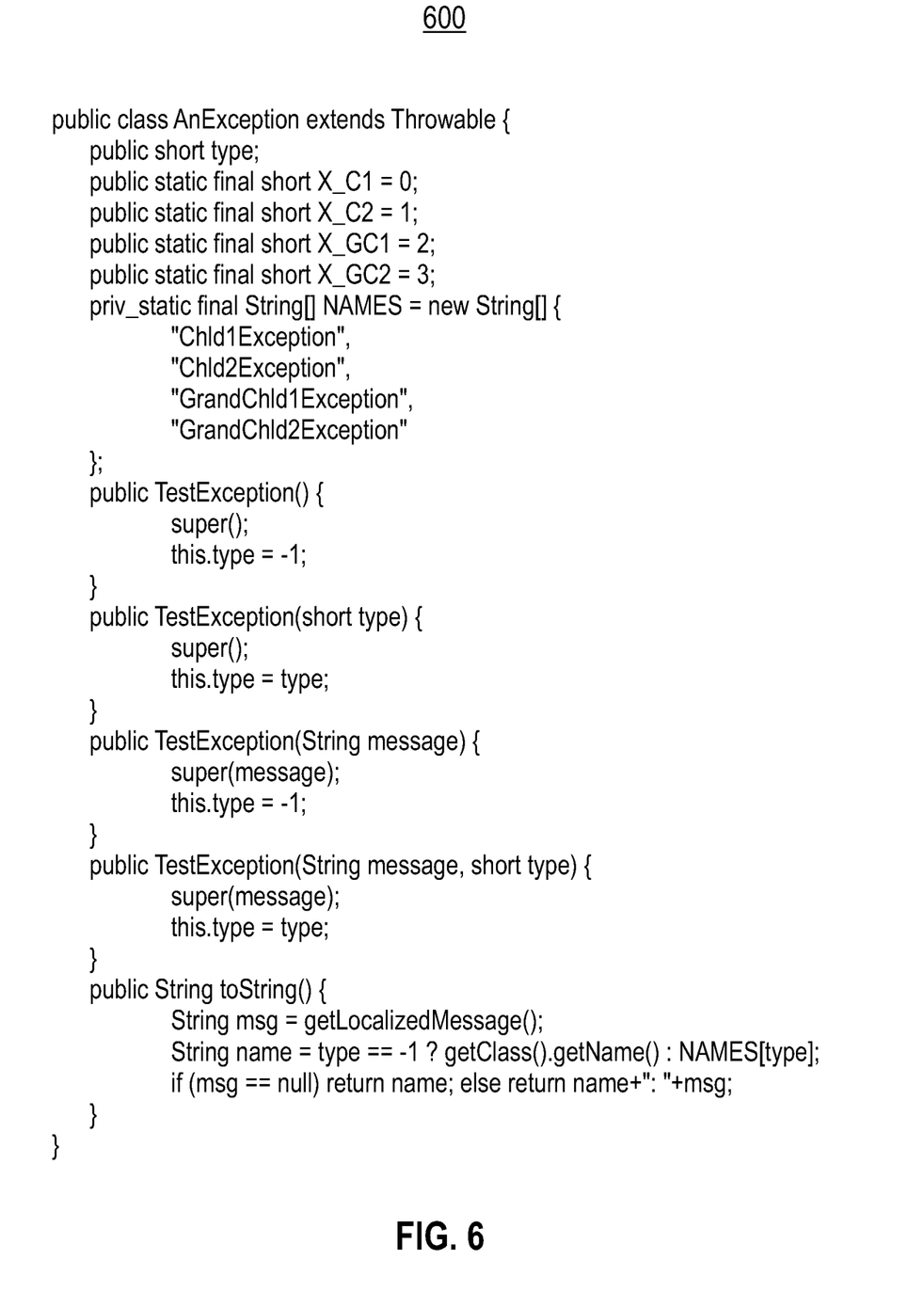
FIG. 6 shows the parent class after the transformation. It will be the only class of the classes in FIG. 6 that will remain.

FIG. 6 shows the parent class after the transformation. It may be the only class of the classes in FIG. 6 that remains.

Figure 7:
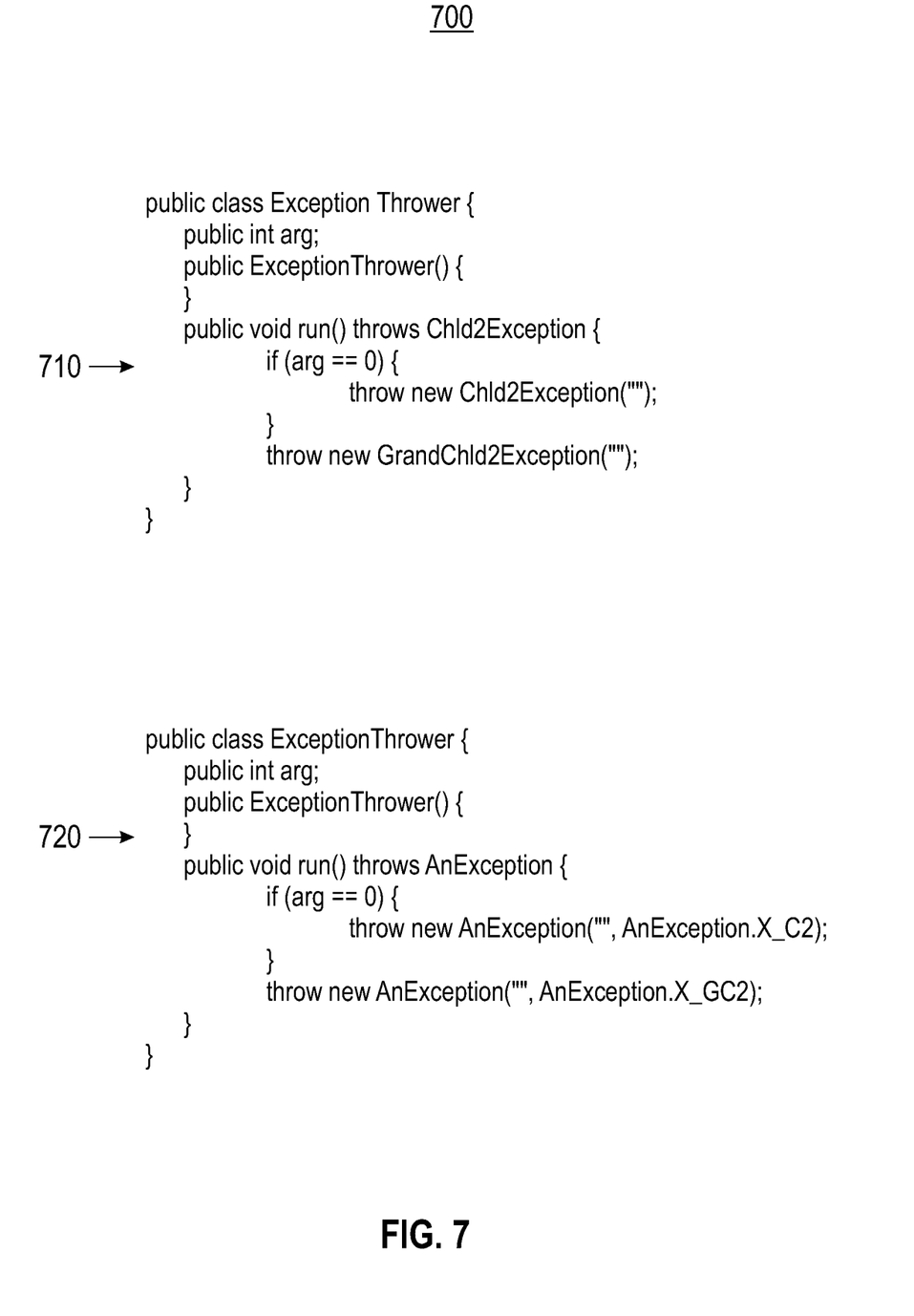
FIG. 7 shows on an example how the reference to an exception can be removed in the case when the exception is created (thrown).

FIG. 7 shows on an example how the reference to an exception can be removed in the case when the exception is created (thrown). At 710, code is shown before the class is refactored. At 710, code is shown after the class is refactored.

Figure 8:
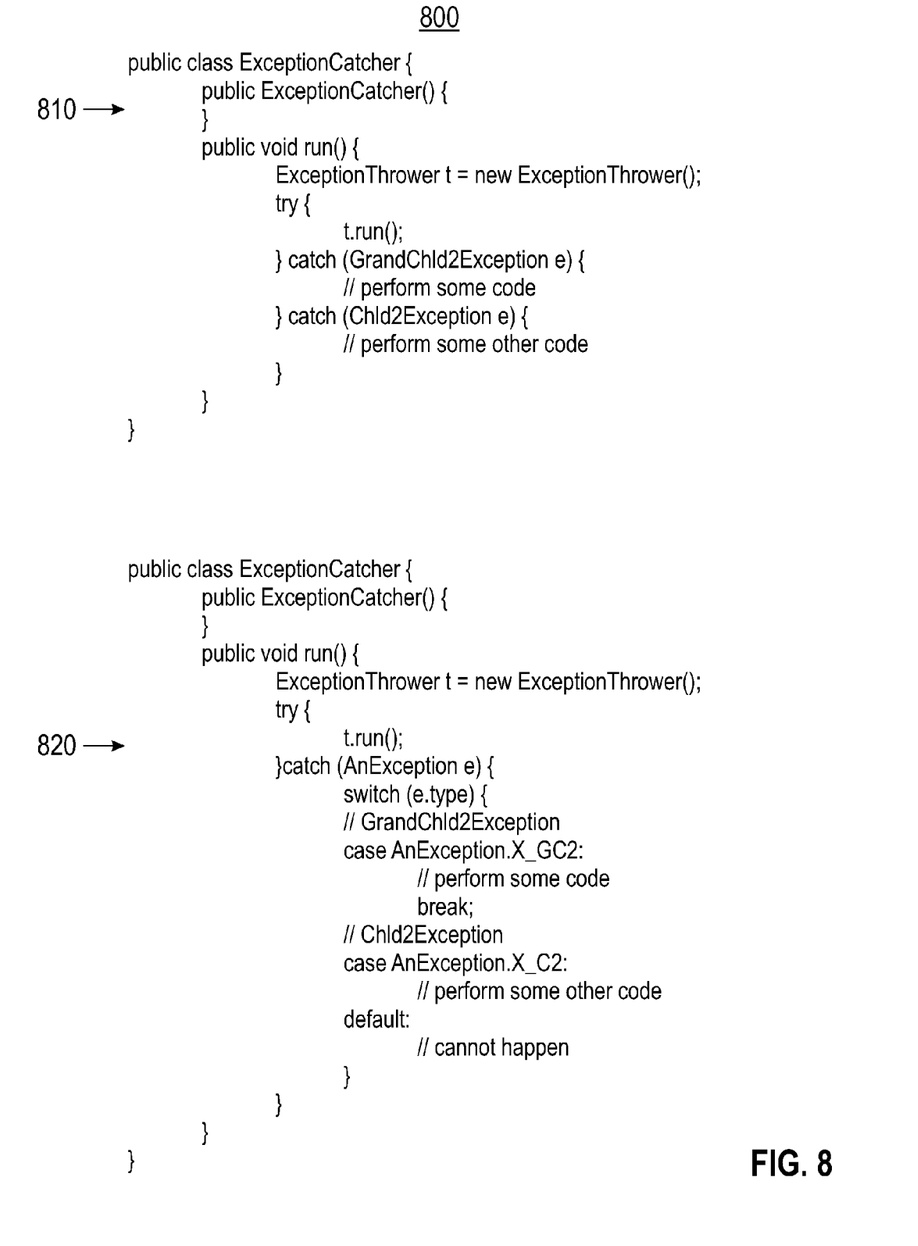
FIG. 8 shows on an example how the reference to an exception can be removed in the case when the exception is handled (caught).

FIG. 8 shows an example how the reference to an exception can be removed in the case when the exception is handled (caught). At 810, code is shown before the class is refactored. At 820, code is shown after the class is refactored. Both 810 and 820 show how an exception is caught. Other kinds of references to candidates of exception classes for removal can be handled in a similar manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A method comprising:
    searching exception classes stored in computer memory for those of the exception classes that match a pattern;
    refactoring the parent classes of the matched exception classes to accept an exception type argument;
    rewriting a section of code that throws the matched exceptions by replacing the exception class with the parent class and adding a corresponding exception type;
    changing a list of thrown exceptions in a method declaration;
    rewriting a section of code that catches the thrown exceptions by changing a catch clause to catch a parent exception class and inserting a case statement for the exception type in that catch clause; and
    removing the matched exception classes;
    wherein the matched exception classes are refactored by:
    adding a public field that encodes a type of the exception;
    adding constructor methods that take the type of the exception as an argument; creating constants for each numeric exception type and using the constants with throwing and catching the exceptions; and
    creating an array with the name of the exception classes for use in the text representation of the exception classes.

2. The method of claim 1, including removing the list of thrown exceptions in the method declaration.

3. The method of claim 1, including creating exception code numbers to represent the exception classes.

4. The method of claim 1, wherein class names are shortened by using initials.

5. The method of claim 1, wherein an exception code number is printed instead of a text representation of the exception classes.

6. The method of claim 1 including adding a call to a constructor to the type of the exception.

7. The method of claim 1, including:
   modifying a catch clause; and
   catching the parent exception class.

8. A computer program product for removing exception classes, the computer program product including a non-transitory computer readable storage medium having computer readable code embodied therewith, the computer readable program code comprising:
   computer readable program code utilizing a computer processor to search exception classes for those of the exception classes that match a pattern;
   computer readable program code that refactors the parent classes of the matched exception classes to accept an exception type argument;
   computer readable program code that rewrites a section of code that throws the matched exceptions by replacing the exception class with the parent class and adding a corresponding exception type;
   computer readable program code that changes a list of thrown exceptions in a method declaration;
   computer readable program code that rewrites a section of code that catches the thrown exceptions by changing a catch clause to catch a parent excepting class and inserting a case statement for the exception type in that catch clause; and
   computer readable program code that removes the matched exception classes;
   wherein the matched exception classes are refactored by:
   adding a public field that encodes a type of the exception;
   adding constructor methods that take the type of the exception as an argument;
   creating constants for each numeric exception type and using the constants with throwing and catching the exceptions; and
   creating an array with the name of the exception classes for use in the text representation of the exception classes.

9. The computer program product of claim 8, including:
   computer readable program code that creates a table including each found exception class;
   computer readable program code that assigns a numeric type to each of the found exception classes; and
   computer readable program code that increments the numeric type value by 1 for each found exception class.

10. The computer program product of claim 8, wherein class names are shortened by using initials.

11. The computer program product of claim 8, wherein an exception code number is printed instead of a text representation of the exception classes.

12. The computer program product of claim 8 including computer readable program code that adds a call to a constructor to the type of the exception.

13. The computer program product of claim 8, including:
    computer readable program code that modifies a catch clause; and
    computer readable program code that catches the parent exception class.

14. The computer program product of claim 8, including computer readable program code that replaces IF statements with switch statements if several exceptions are caught in the same block of code.

15. A system comprising:
    a computer including a computer processor for removing exception classes; and
    an exception class removing engine to remove exception classes, wherein the removing comprises:
    searching exception classes for those of the exception classes that match a pattern;
    refactoring the parent classes of the matched exception classes to accept an exception type argument;
    rewriting a section of code that throws the matched exceptions by replacing the exception class with the parent class and adding a corresponding exception type;
    changing a list of thrown exceptions in a method declaration;
    rewriting a section of code that catches the thrown exceptions by changing a catch clause to catch a parent exception class and inserting a case statement for the exception type in that catch clause; and
    removing the matched exception classes;
    wherein the matched exception classes are refactored by:
    adding a public field that encodes a type of the exception;
    adding constructor methods that take the type of the exception as an argument; creating constants for each numeric exception type and using the constants with throwing and catching the exceptions; and
    creating an array with the name of the exception classes for use in the text representation of the exception classes.

16. The system of claim 15, including a computer display to display the removed exception classes and refactored classes.

17. The system of claim 15, including an optimizer that removes unused methods from the parent exception classes.

18. The system of claim 17, wherein the optimizer further removes unused type names from the parent exception classes.

19. The system of claim 17, wherein the optimizer further removes unused exception types from the parent exception classes.

20. The system of claim 15, wherein the exception class removing engine creates a table including each found exception class.

21. The system of claim 15, wherein a numeric type is assigned to each exception class.

22. The system of claim 17, wherein the optimizer further creates constants for each of the plurality of numeric exception types.

* * * * *